May 16, 1950            J. GROUNDS            2,507,903

BARBED WIRE REELING DEVICE

Filed April 2, 1948                                2 Sheets-Sheet 1

INVENTOR.
JOHN GROUNDS,
BY
McMorrow, Berman + Davidson
ATTORNEYS.

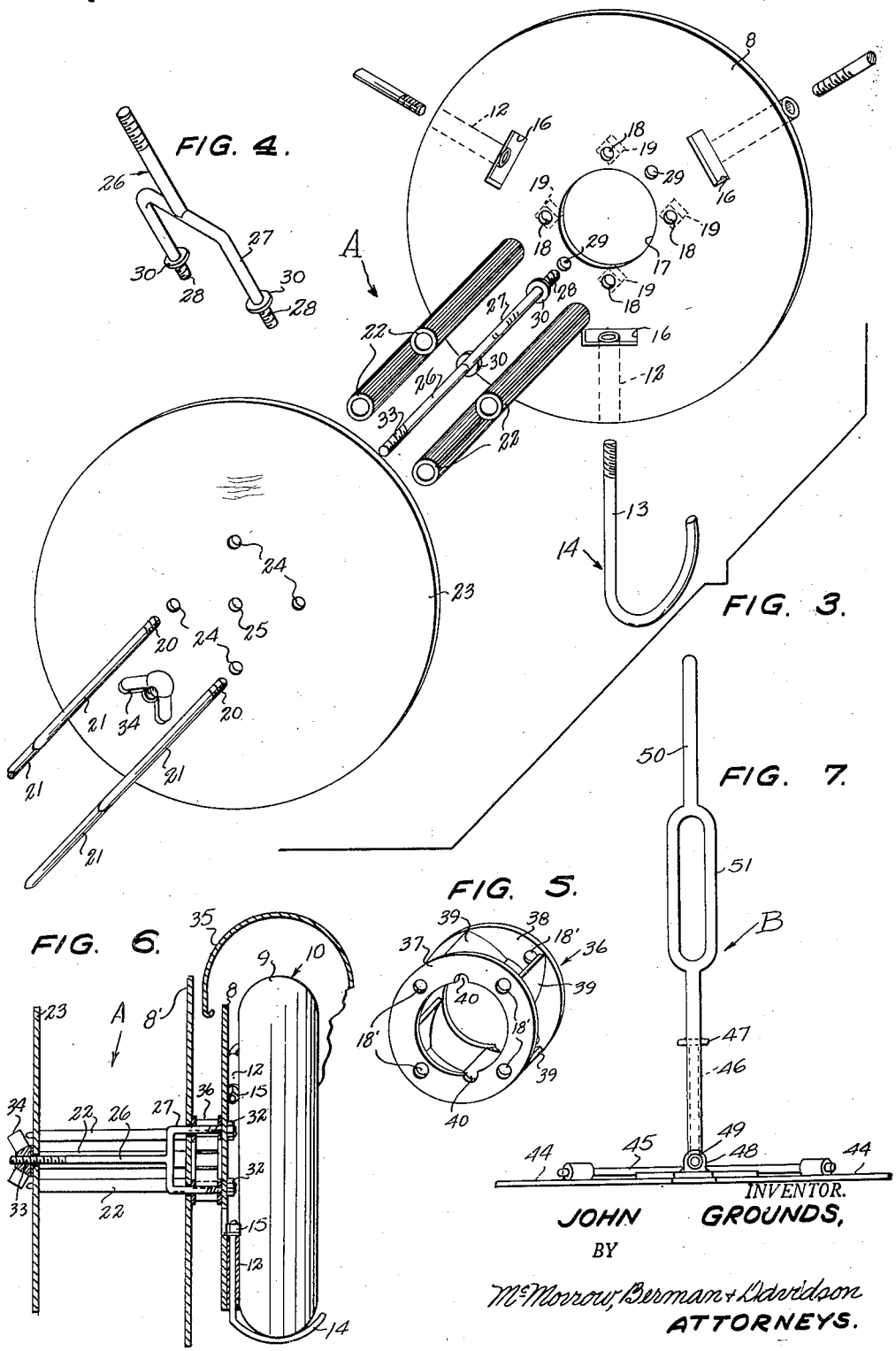

Patented May 16, 1950

2,507,903

UNITED STATES PATENT OFFICE 2,507,903

BARBED-WIRE REELING DEVICE

John Grounds, Valentine, Ariz.

Application April 2, 1948, Serial No. 18,693

2 Claims. (Cl. 242—95)

This invention relates generally to improvements in reeling devices adapted to be mounted on and operated by a driven wheel of a motor vehicle, and more particularly to an improved device of this nature especially, but not exclusively, adapted to the salvaging of barbed wire from standing fences with such small risk of breaking the wire and with sufficient speed and efficiency to warrant extensive barbed wire salvaging operations.

A primary object of the invention is to provide a device of the above indicated character which although rugged and serviceable and of quick and easy adaptability to mounting on different size vehicle driven wheels, is of simple and inexpensive construction.

Another important object of the invention is the provision of a device of the character indicated above which securely mounts on the vehicle driven wheel so as to be supported on the tire thereof rather than upon the axle assembly or upon the wheel bolts, whereby loosening or demounting of the wheel relative to the drive axle is eliminated in installing and removing the device with respect to a wheel already "on the ground."

Other important objects and advantageous features of the invention will be apparent from the following description and accompanying drawings, wherein for present purposes of illustration only, a specific embodiment of the invention is set forth in detail.

In the drawings:

Figure 3 is an exploded perspective view showing the relation and form of component parts of the reel.

Figure 4 is a perspective view of the tie rod.

Figure 5 is a perspective view of a reel spacer.

Figure 6 is a general transverse vertical section taken through the reel, with the associated wheel in elevation, showing the reel spacer in use to position the reel outwardly of a vehicle wheel fender.

Figure 7 is a left-hand end elevation of the wire guide.

Figure 1:
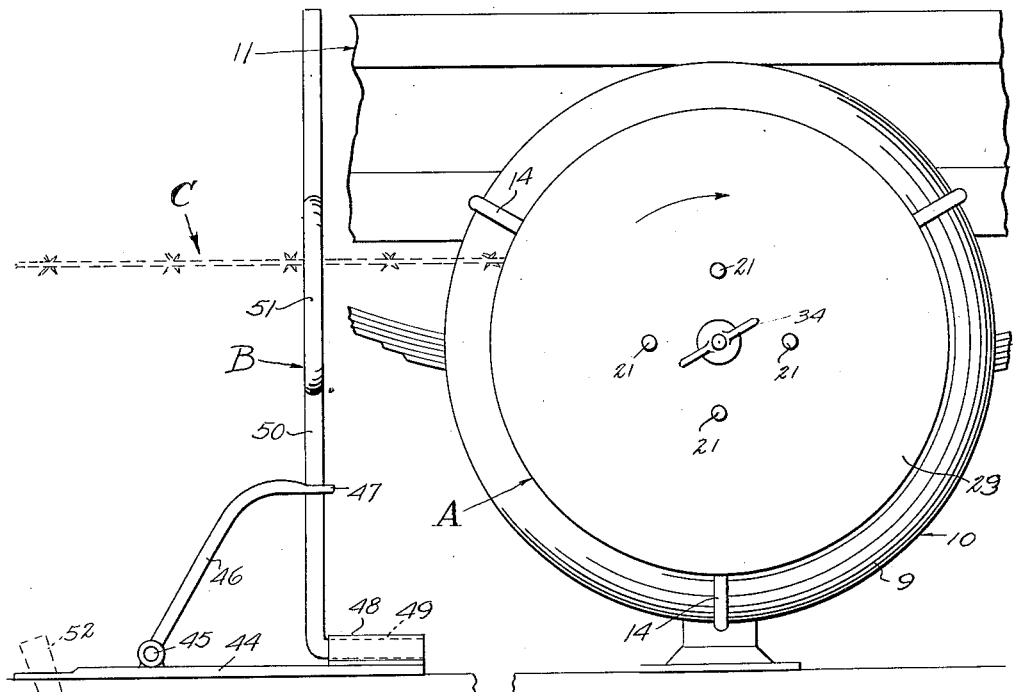
Figure 1 is a fragmentary outboard side elevation showing the illustrated device installed and in operative position on a driven wheel of a vehicle, in conjunction with the barbed wire guide for distributing the wire evenly on the reel.
Figure 2:
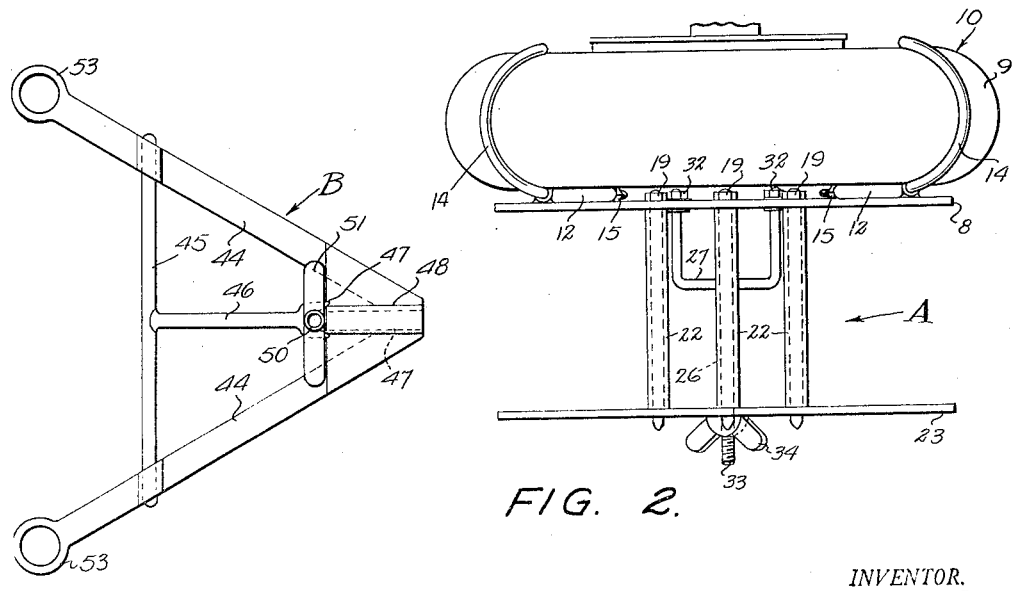
Figure 2 is a top plan view showing the reel installed on a vehicle-driven wheel, in conjunction with the wire guide.

Referring in detail to the drawings, the illustrated device of the invention comprises the reel component A and the wire guide component B. While the reel A can function for certain purposes without the aid of the wire guide B, the wire guide B is necessary to enable feeding and distributing the salvaged barbed wire C, from a standing fence or from the ground when detached from fence posts, onto the reel A in properly wound condition to form a usable and merchandisable wire coil.

The reel A comprises an inboard circular disk 8 of relatively stiff sheet metal, of a diameter somewhat less than the periphery of the tire 9 on the driven wheel 10 of the vehicle 11. Radial tubes 12, at least three in number, are welded on or otherwise secured to the inboard side of the disk 8 at regular circumferential intervals, to accommodate the bolt shanks 13 of tire-gripping hooks 14, which are arranged to reach inwardly around the wheel tire 9, the shanks 13 being threaded and provided with nuts 15 to bear against the inward ends of the tubes 12 and to be tightened to contract the hooks 14 on the tire 9 and position the disk 8 concentrically with respect to the tire. The disk 8 is formed with slots 16 at the inward ends of the tubes 12 providing access to the nuts 15 from the outboard side of the disk 8.

Equally-spaced around a center hole 17 in the inboard disk 8 are bolt holes 18, in registry with which nuts 19 are secured to the inboard side of the disk 8, with which nuts the threaded inboard ends 20 of four or other suitable number of rods 21 are threadably engageable through the holes 18. On the rod 21 are placed similar length spacing tubes 22, shorter than the rods, whose length determines the axial width of the reel A.

Supported on the rods 21 is the outboard disk 23, which may be of the same or of smaller diameter than the inboard disk 8, and provided with holes 24 accommodating the rods and with a center hole 25, accommodating the tie rod 26. The inboard end of the tie rod 26 terminates in a U-shape 27 the free ends 28 of whose legs are arranged to pass through holes 29 in the inboard disk 8 with fixed stops or collars 30 engaging the outboard side of the disk 8, the free ends 28 of the legs being threaded and provided with nuts 32 engageable with the inboard side of the disk 8 to anchor the tie rod in place. The outboard end of the tie rod 26 which passes through the center hole 25 of the outboard disk 23 is threaded, as indicated at 33, to receive the wing nut 34, which is arranged to be turned up against the outboard side of the outboard disk 23 to clamp the same against the outboard ends of the spacer tubes 22.

In the event that, as shown in Figure 6, the vehicle involved has a fender 35 overlying the wheel, a reel spacer 36, shown in Figure 5, is utilized to position the reel A beyond the fender 35. The spacer 36 comprises two concentric flat annuli 37, 38, respectively, spaced and connected by transversely curved spirally-arranged plates 39. These annuli are provided with circumferentially-spaced holes 18' to match and register with the holes 18 in the inboard disk 8. The annuli are also formed with notches 40, 40 to receive the legs of the U-shape 27 on the tie rod 26.

In using the spacer 36 it is placed on the rods 21 before the outboard disk 23 and the tie rod 26 are assembled, and an extra inboard disk 8' having holes like the holes 18 of the inboard disk 8, is assembled on the rods 21, after which the spacer tubes 22 are put in place on the rods 21, the tie rod put in its place, and the outboard disk 23 assembled with its legs in the notches 40, 40 of the extension.

In either case, the reel A, assembled as described above, is ready to wind or reel the barbed wire C thereon as soon as the wheel 10 is raised from the ground 41 by means of a suitable jack 42 applied to the vehicle 11, and the vehicle motor is operated to turn the wheel 11 in the clockwise direction indicated by the arrow in Figure 1, the rear end of the wire C having been suitably secured to the hub of the reel A, constituted by the tubes 22.

Proper reeling of the wire C upon the reel A is dependent, however, upon proper guiding of the wire thereto along the axis of the reel, and for this purpose the wire guide B is secured to the ground 41 in front of the reel A. The wire guide B comprises a base, to rest upon the ground, consisting of a pair of diverging arms 44, 44 connected together at their meeting ends, and spaced by a shaft 45 journaled through the arms 44, 44 intermediate their ends, the shaft 45 having a radial brace 46 projecting from the midpoint, the face end of the brace having a downwardly deflected fork 47. A tubular journal 48 is fixed horizontally and in longitudinal position in the juncture of the arms 44, 44 and a lateral terminal 49 in the lower end of the guide bar 50 is journaled in the tube 48.

The guide bar 50 comprises a straight bar with a vertically-elongated oval wire guiding loop 51 formed therein below its upper end, the part of the bar above the loop acting as a handle to enable the rod to be moved on the axis of its terminal 49 from side-to-side, with the barbed wire C passing through the loop 51, as maybe needed to properly guide the wire onto the reel A during a reeling operation.

The wire guide B is anchored to the ground 41, by stakes 52 driven into the ground 41 through eyes 53 provided on the free ends of the base arms 44, 44 or by any other suitable means for securing the guide relative to the vehicle 11 and to reel A.

When the brace fork 47 is engaged with the rod 50, the latter is held in a perpendicular intermediate position. When it is desired to move the bar 50 toward either side of such position for feeding the wire C to the reel A, the brace 46 is swung, on the axis of the shaft 45, to an out-of-the-way position out of engagement with the bar 50.

The reel can be used on either right or left back vehicle wheels, and after once having been adjusted to fit a tire, lock nuts can be placed on two of the tire clamp nuts, leaving the remaining tire clamp bolt and nut to be used as a quickhoop-up means whereby the device can thereafter be installed and removed by the tightening and loosening of only one nut.

What is claimed is:

1. A wire reel for attachment to a vehicle driven wheel equipped with a pneumatic tire comprising a circular disk disposable against the outer side of such a wheel, radially-disposed, angularly, spaced-apart tubes secured to the wheel adjacent side of said disk near the periphery of the latter, respective tire-engaging hooks slidably received in said tubes, nuts on said hooks at the inner ends of said tubes for clamping said disk to an associated vehicle wheel, angularly, spaced-apart rods secured to said disk near the center of the latter and extending outwardly from the outer side of said disk, respective spacer tubes surrounding said rods, a tie rod secured to said disk substantially concentric with the latter and extending outwardly from the outer side of said disk between said rods, an outer disk having apertures therein receiving said rods and said tie rod, and a nut on said tie rod bearing against the side of said outer disk remote from said first mentioned disk to releasably secure said outer disk on said rods and against the adjacent ends of said spacer tubes.

2. A wire reel for attachment to a vehicle driven wheel equipped with a pneumatic tire comprising a first circular disk disposable against the outer side of such a wheel, adjustable tire-engaging means on the wheel adjacent side of said disk for securely clamping the disk to an associated wheel, rods secured at corresponding ends to said first disk at angularly, spaced-apart locations around and adjacent to the center of the latter and extending outwardly from said first disk opposite the wheel adjacent side thereof, a tie rod secured at one end to said first disk and extending outwardly of the latter between said rods, an annular reel spacer having a diameter materially less than the diameter of said first disk disposed against the outer side of said first disk and positioned substantially concentric with the latter, said reel spacer having apertures therethrough receiving said rods and said tie rods, a second circular disk substantially concentric with said first disk and disposed against the side of said reel spacer remote from said first disk, said second circular disk having apertures therethrough receiving said rods and said tie rods, respective tubular spacers on said rods bearing at corresponding ends against the side of said second disk remote from said first disk, a third disk concentric with said first and second disks having apertures receiving said rods and said tie rod, and a nut on said tie rod bearing against the side of said third disk remote from said second disk to releasably hold said third disk in engagement with the adjacent ends of said tubular spacers.

JOHN GROUNDS.

REFERENCES CITED

The following references are of record in the file of this patent:

UNITED STATES PATENTS

| Number | Name | Date |
|---|---|---|
| 944,956 | Dunlap | Dec. 28, 1909 |
| 1,068,537 | Smith | July 29, 1913 |
| 1,151,819 | Pittman | Aug. 31, 1915 |
| 1,504,939 | Carmony | Aug. 12, 1924 |
| 1,564,985 | Stromberg | Dec. 8, 1925 |
| 1,769,380 | Master | July 1, 1930 |
| 2,228,042 | Zanger | Jan. 7, 1941 |